United States Patent Office
2,925,328
Patented Feb. 16, 1960

2,925,328

APPARATUS FOR EXTRACTING AROMATIC PRODUCTS SUCH AS ESSENTIAL OILS, EXTRACTS AND THE LIKE, FROM THEIR NATURAL SUPPORTS

Lucien Marius Romagnan, Nice, France, assignor to Société d'Exploitation des Brevets Alce, Paris, France, a corporation of France Application March 6, 1956, Serial No. 569,926

Claims priority, application France September 7, 1955

1 Claim. (Cl. 23—267)

The essential object of this invention is to provide an apparatus for extracting aromatic products such as essential oils, extracts and the like, from their natural supports by using supersonic frequency waves.

Various methods have already been proposed for separating aromatic oils and the like from their natural supports. One of these methods is described in the French Patent No. 969,905, dated July 26, 1948, and consists in vibrating these natural supports by means of supersonic waves which, due to the resonance phenomenon, desintegrate these supports. This method is applicable in a liquid, gaseous or like medium.

More particularly, when the process is carried out in a liquid medium the vibration applied thereto by the supersonic generator produces pressure variations facilitating greatly the dispersion of the desired products in this medium after they have been separated from their natural supports.

The extraction method applied in the apparatus according to this invention pertains to the aforesaid type and is remarkable notably in that it consists in placing the selected natural supports such as flowers, seeds, beans, roots, etc., optionally in a pre-divided state, in a container adapted to be immersed in or to contain the aforesaid liquid medium, subjecting this liquid medium to one or more sources of supersonic waves, and finally discharging said natural supports by separating said container from said liquid medium through their relative displacement.

According to one possible embodiment of this invention the supports to be treated may be placed in a movable container of basket or like structure, adapted to be immersed in the liquid medium, and, upon discontinuance of the action exerted by said supersonic waves, extracting said basket or like structure from said liquid medium and finally discharging from said basket or like structure the treated natural supports or waste products.

According to a further embodiment the natural supports to be treated may be placed directly in a tank or the like, containing the selected liquid medium, and, upon discontinuance of the action exerted by said supersonic waves, removing the liquid from the tank, discharging from said tank the treated supports contained therein, and filling said tank with the same or fresh liquid medium in view of subjecting another batch of natural supports to the action of supersonic waves.

Thus, a semi-continuous process is obtained whereby it is possible to either extract the desired products from a predetermined batch of natural supports by placing them in successive quantities of extraction liquid which are then subjected to the action of supersonic waves, or employing the same liquid medium for treating several batches of natural supports by successively repeating the operations of loading and discharging the container until the desired degree of liquid medium saturation is obtained.

The present invention concerns an apparatus remarkable notably in that it comprises one or more sources of supersonic waves, a liquid medium subjected to the action of said source or sources, a container adapted to be immersed in or to contain said liquid, means for charging said container with the natural products to be treated, and means adapted upon completion of the treatment of said natural supports to separate said container from said liquid medium by causing their relative displacement.

The supersonic vibration sources may be electrical or mechanical. They can be either immersed in the extraction liquid or secured on the wall of the tank containing the aforesaid liquid, their number and arrangement being essentially subordinate to their power and to the mass of liquid to be acted upon. These sources may advantageously be so disposed that the different regions or volumes of the extraction liquid to be handled separately interfere with one another to avoid any untreated zone. If these sources are immersed they may be carried by the axial shaft of the container, for example a basket or the like containing the natural supports to be treated, according to another possible embodiment of this invention.

To prevent the product thus released from the natural supports from agglutinating, and some of its portions from remaining unaffected by the vibratory waves, agitators may be arranged within the extraction tank, these agitators being either in the form of movable rods or the like, actuatable from the outside, or in the form of a pulsating device operating continuously and mounted on the treating tank or vat.

Other features and advantages of this invention will appear as the following description proceeds with reference to the attached drawings forming part of this specification and illustrating diagrammatically by way of example one possible embodiment of the invention. In the drawings.

Figure 1:
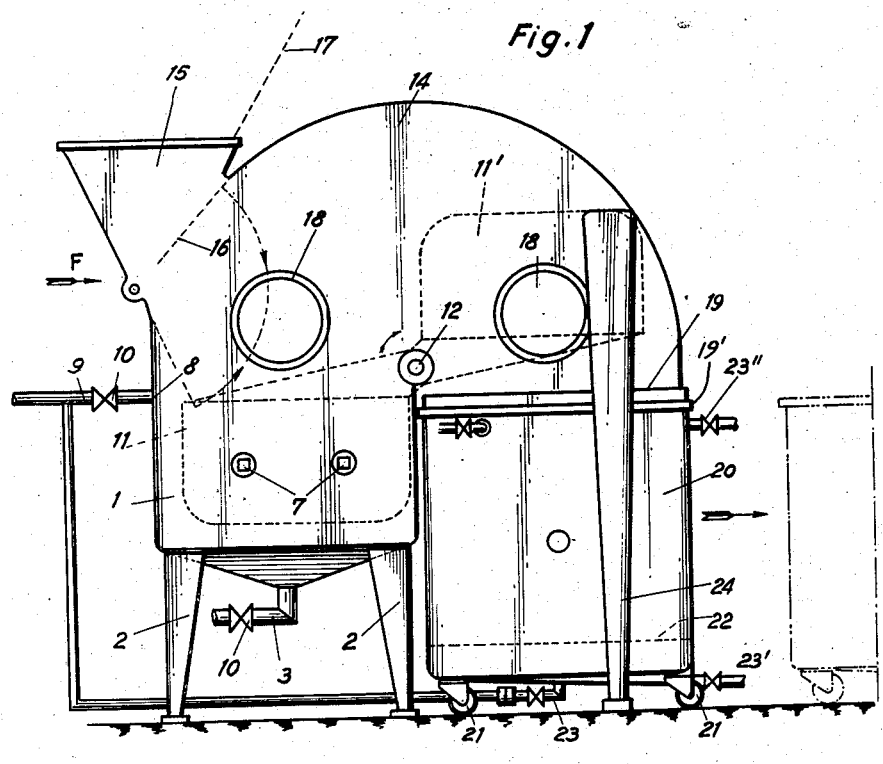
Figure 1 is a diagrammatical elevational view showing an extraction apparatus constructed in accordance with the teachings of this invention.
Figure 2:
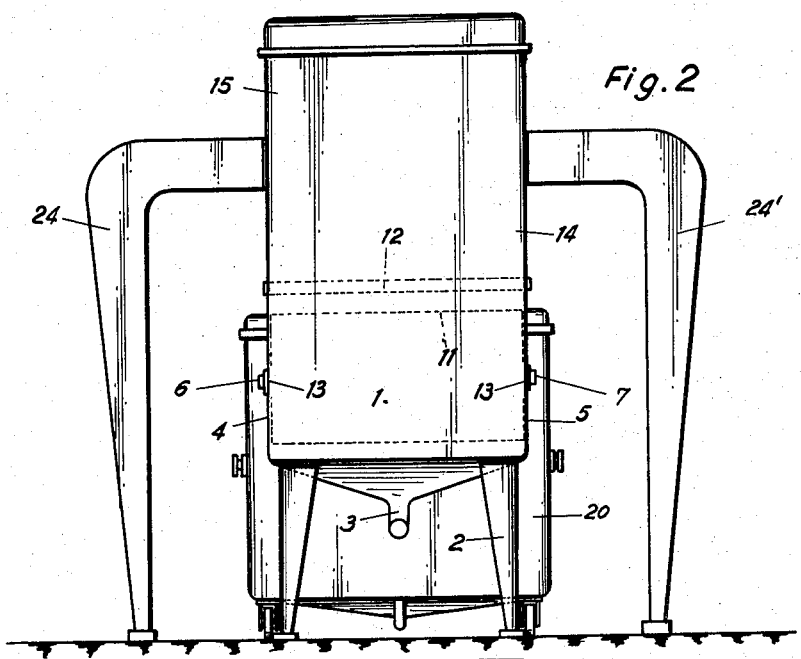
Figure 2 is a side elevational view taken in the direction of the arrow F of Figure 1.
Figure 3:
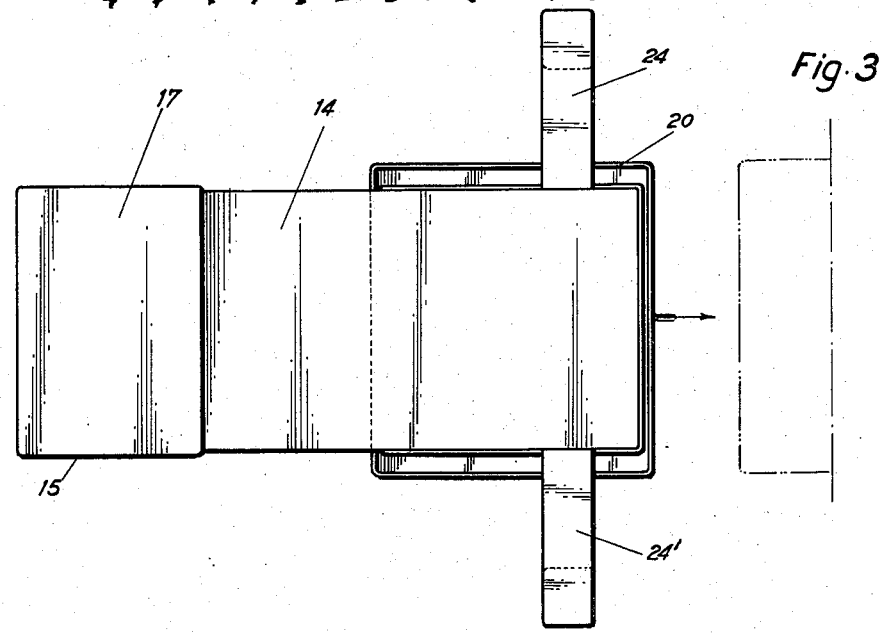
Figure 3 is a plan view from above of the arrangement shown in Figure 1.

In the typical embodiment shown in the drawing, an extraction apparatus comprises a tank or vat 1 supported by legs 2 and provided at its lower portion with a discharge pipe 3. Supersonic wave generators 6, 7 are mounted on the lateral walls 4, 5 of the tank 1. These supersonic generators may be of any suitable type, such as quartz, magnetostriction type, etc. In this example, four generators are provided, but it will be readily understood that their number may vary according to the type and size of the tank employed. At its upper portion the tank 1 has formed a lateral orifice 8 connected to a supply pipe 9 for feeding extraction liquid to the tank. Valve or cock means 10 and 10' may optionally be provided on the pipes 3 and 9 respectively for regulating the outputs therein.

Inside the tank 1 a container 11 preferably of basket like structure is disposed, as shown. This container 11 may have perforated sheet-metal walls or wire-netting walls, etc. The container 11 is adapted to be placed in two well-defined positions shown in dotted lines at 11 and 11' in Figure 1. The basket-like container 11 is movable from one position to the other by rotation about a transverse shaft 12.

Of course, the structure of the walls of the basket-like container 11 is subordinate to the degree of fineness of the products to be treated therein in each case;

thus, in the case of ground coffee, iris powder, etc. these walls may consist of wire guaze.

If desired, transverse baffles or partitions may be disposed in this container 11 to reduce the volume in which the supersonic generators are operative. The thus concentrated energy will attack more easily and efficiently certain dry and hard products, such as sandalwood.

The basket-like container 11 is provided on its lateral walls with ports 13 adapted to register with the sources of supersonic waves 6, 7 when the container is immersed in the bottom of the tank to permit the propagation of vibration through the container.

The complete tank and container assembly is covered by a preferably air-tight housing 14 incorporating a filling hopper 15 of substantially the same width as the apparatus; this hopper 15 is provided with a movable bottom 16 which by rotation about a substantially horizontal axis 16' is adapted to be placed either in an upper hopper-closing position or in a lower hopper-discharging position. A top cover 17 is adapted to close the hopper 15.

The housing 14 consists of an air-tight sheet-metal case for example of semi-cylindrical shape, as shown, so as to permit and enclose the path of movement of the basket-like container 11 when the latter is moved from one to the other of its positions. This housing 14 is provided with side-lights 18 for supervising and controlling from the outside the different steps of the extraction operation. The end 19 of this housing 14 which is opposite to the tank 1 is so shaped that it can be fitted through a sealing gasket 20' on the top of a bucket or like container 20 mounted on wheels 21 and adapted to facilitate the discharge of the natural supports upon completion of the treatment thereof by the supersonic waves.

Preferably, this bucket 20 is provided at a level located a short distance above its bottom with a detachable grid 22 for draining the waste products collected therein; furthermore, this bucket is provided with filling and discharge ducts shown diagrammatically at 23, 23', 23'', 23'''. This bucket 20 is also adapted to be provided with a fluid-tight cover mounted on its top edge when the bucket is removed from the apparatus. In addition, it is adapted to be fed with steam for a purpose to be explained presently.

The reference numerals 24, 24' designates a pair of lateral struts located on either side of the housing 14 and adapted if desired to support and rigidly hold in position this housing at the level of its open end 19. The means employed for controlling the rotation of the basket-like container 11 about its axis 12 are not shown in the drawings, but anybody skilled in the art will be readily aware that this rotational movement may be controlled most simply through crank means or other known mechanical means.

Now the operation of the apparatus in the practical case of a commercial extraction process will be described.

Let us assume firstly that the natural support to be treated consists of jasmine flowers, that the extraction liquid medium is petroleum ether, and that the power of the supersonic wave source utilised is about 1,200 watts.

The tank 1 is filled with petroleum ether, its capacity being about gallons: 158.5. This quantity is such that the liquid level in the tank will be somewhat below the top edge of the basket-like container 11 when the latter is in its operative position. Thus, the flowers discharged into this container cannot escape therefrom.

The hopper 15 is then filled with a sufficient quantity of jasmine flowers, for example a 38-pound batch, and the supersonic generators are subsequently actuated. On the other hand, the bucket 20 is positioned beneath the extremity 19 of the housing 14.

The hopper 15 is then opened and the flower batch will fill the container 11; a fresh batch is subsequently placed into the hopper 15 after re-closing the pivoting shutter 16 thereof. After about 20 minutes of contact with the liquid in which the flowers are immersed, the basket 11 is raised, tilted and brought above the bucket 20 in which the treated and drained flowers are discharged by gravity.

Then the basket 11 is tilted in the opposite direction and thus re-immersed in the liquid, and the hopper 15 will discharge in the basket 11 another batch of flowers, and the operational steps are repeated until the desired degree of ether saturation is obtained. During these operations the ether drained from the waste products discharged in the bucket 20 is fed back to the tank 1 via the discharge duct 23 of the bucket 20 and a removable pipe or hose 25 connected between the duct 23 and the inlet pipe 9 of the tank 1. The tank 1 has its liquid level maintained to a constant value by supplying fresh solvent thereto.

Upon completion of the operating cycle the ether is discharged from the tank 1 for its subsequent treatment thereof and the bucket 20 is removed to transfer the waste products to other stations where they may be treated for example with steam for recovering any solvent still impregnated therein. Another empty bucket 20 is placed meanwhile beneath the housing 14 in replacement of the bucket just removed.

The cycle may be repeated as described hereinabove.

The process described may be varied to a substantial extent according to the products to be treated, the modifications concerning essentially the type of extraction liquid employed, the proportion of treated products, the quantity of liquid, the time period in which the supersonic vibration treatment is applied, the temperature of the medium during the treatment, etc.

Different devices may be mounted on the tank 1, such as heating devices, level gauges, etc. as well as any other instruments and apparatus (not shown) for controlling the operational steps and providing certain requirements concerning temperature, pressure, etc.

Of course, the tilting movements of the basket-like container may be replaced by a double movement of translation combined with the operation of a drop-bottom provided on this container for discharging the waste products, or the combination of a linear movement with a rotational movement may be resorted to, without departing from the scope of the invention.

Still within the purpose of this invention the basket-like container 11 may be dispensed with by using thereinstead the tank 1 which, in this case, will directly receive the natural products to be treated; in this case the extraction liquids are removed after each extraction step to permit the removal of the treated products; this tank is subsequently refilled with the liquid to be saturated, whilst introducing therein a fresh batch of natural products, the cycle being repeated as in the above-described example.

It is also possible to replace the bucket 20 by any suitable discharge device such as a mechanical conveyor or the like adapted to re-cycle the waste products issuing from a first extraction treatment in view of applying one or more subsequent treatments thereto.

Of course, the invention is not restricted to the single form of embodiment shown and described herein by way of example, as many modifications may be brought thereto without departing from the spirit and scope of the invention as set forth in the appended claim.

What I claim is:

An apparatus for preparing concretes, resinoids and pomades utilized in the perfume industry by washing flowers in a solvent in the presence of supersonic vibrations, comprising a stationary tank provided with an inlet orifice adjacent its top and an outlet orifice at its bottom for feeding and evacuating solvent, sources of supersonic waves secured on the walls of said tank and located so as to be immersed in said solvent, an airtight housing comprising an elongation of said tank extending transversely of said tank adjacent the top thereof, and having an open bottom substantially equal in dimensions to the dimensions of said tank, and the upper portion of said housing being arcuate, a hopper having a removable bottom in the top of said housing, a tilting container having open mesh walls, said container being disposed in said tank and normally immersed in said solvent, an axle mounting said container for swinging movement at the top of said tank and adjacent the open bottom of said housing, said axle being located at approximately the center of the arcuate section of said housing whereby said container may be swung to inverted position over said open bottom, said arcuate upper portion of said housing accommodating the swinging movement of said container, a wheeled bucket positionable beneath said open bottom, a sealing gasket for connecting the open top of said bucket with said open bottom in fluid-tight sealing relation, a strainer disposed in said bucket for separating solid and liquid materials, and fluid outlet means in said bucket connected to said inlet orifice of said tank.

References Cited in the file of this patent
UNITED STATES PATENTS

| | | |
|---|---|---|
| 253,590 | Raoul et al. | Feb. 14, 1882 |
| 581,910 | Goetz | May 4, 1897 |
| 2,043,103 | Kester | June 2, 1936 |
| 2,495,295 | Spanier | Jan. 24, 1950 |
| 2,516,968 | Faler | Aug. 1, 1950 |
| 2,712,008 | Kirchner | June 28, 1955 |
| 2,717,768 | Carpentier | Sept. 13, 1955 |